US010294048B2

(12) United States Patent
Smith

(10) Patent No.: US 10,294,048 B2
(45) Date of Patent: May 21, 2019

(54) DOCK BUMPER AND METHOD OF REPLACEMENT

(71) Applicant: A-FAX LIMITED, Elland, West Yorkshire (GB)

(72) Inventor: Luke Smith, Halifax (GB)

(73) Assignee: A-FAX LIMITED, Elland (GB)

( * ) Notice: Subject to any disclaimer, the term of this patent is extended or adjusted under 35 U.S.C. 154(b) by 114 days.

(21) Appl. No.: 14/173,159

(22) Filed: Feb. 5, 2014

(65) Prior Publication Data

US 2014/0319743 A1 Oct. 30, 2014

(30) Foreign Application Priority Data

Apr. 25, 2013 (GB) .................................. 1307516.3

(51) Int. Cl.
*B65G 69/00* (2006.01)
*B60R 19/32* (2006.01)

(52) U.S. Cl.
CPC ....... *B65G 69/001* (2013.01); *Y10T 29/49623* (2015.01)

(58) Field of Classification Search
CPC .... B65G 69/001; B65G 69/008; B60R 19/32; B60R 19/00; B63B 59/02
See application file for complete search history.

(56) References Cited

U.S. PATENT DOCUMENTS 1,347,389 A * 7/1920 Larsen ...................... E02B 3/26 114/220
1,569,393 A * 1/1926 Rathers .................. D06F 45/22 474/191
3,058,738 A * 10/1962 Corson ................ B65G 69/001 114/219
3,084,517 A * 4/1963 Bell .......................... E02B 3/24 114/220
3,145,685 A * 8/1964 Kulick, Sr. ............. B63B 59/02 114/220
3,254,491 A * 6/1966 Levinton .................. E02B 3/26 114/219

(Continued)

FOREIGN PATENT DOCUMENTS

EP 0 648 644 A1 4/1995
EP 2 431 235 A1 3/2012

OTHER PUBLICATIONS

British Search and Examination Report issued in British Patent Application GB1307516.3 dated Jul. 24, 2013.

*Primary Examiner* — Bradley T King
*Assistant Examiner* — James K Hsiao
(74) *Attorney, Agent, or Firm* — Oliff PLC

(57) ABSTRACT

A dock bumper is provided. The dock bumper includes a housing holding a plurality of rollers arranged in an array. The plurality of rollers are arranged to absorb impact from a reversing vehicle. Upon impact, outer surfaces of the rollers are arranged to rotate relative to the frame. Consequently, scrubbing between the vehicle and dock bumper is reduced as are excess forces acting on fixings between the frame and wall. Also, a surface area at each contact location is increased as a cushioning effect is provided by rotation of the roller, thereby prolonging the operation life of the rollers. Furthermore, in one form, the dock bumper is modularized so that only worn or damaged rollers need be replaced at one time.

4 Claims, 7 Drawing Sheets

(56) References Cited

U.S. PATENT DOCUMENTS 3,402,558 A * 9/1968 Hellinger ................ B63B 59/02 114/220
3,416,484 A * 12/1968 Chapman .............. E01F 15/003 114/220
3,464,214 A * 9/1969 King ......................... E02B 3/24 114/219
3,528,383 A * 9/1970 Fetters ...................... E02B 3/26 114/220
3,762,982 A * 10/1973 Whittington ............ F16L 11/12 138/110
3,923,292 A * 12/1975 Madden, Jr. .............. F16F 7/12 188/377
3,988,999 A * 11/1976 Janssen ................... B63B 35/70 114/242
3,991,582 A * 11/1976 Waldrop ............... E02B 17/003 114/220
4,063,526 A * 12/1977 Ueda ....................... B63B 59/02 114/220
4,148,270 A * 4/1979 Bludworth .............. B63B 35/70 114/248
4,205,105 A * 5/1980 Blundell ............... F16L 59/023 138/120
4,312,444 A * 1/1982 Mushovic .......... B29D 99/0035 193/37
4,359,239 A * 11/1982 Eggert, Jr. .............. B60R 19/56 280/784
4,535,526 A * 8/1985 Zerfass ................... B32B 15/08 138/149
4,645,071 A * 2/1987 Faulkner ................ B65G 39/12 193/37
4,646,677 A * 3/1987 Lounsbury, Jr. ... G03G 15/0818 399/119
4,662,611 A * 5/1987 Ruane ................. E01F 15/0423 256/13.1
4,679,517 A * 7/1987 Kramer ................... B63B 59/02 114/219
4,804,296 A * 2/1989 Smath ....................... E02B 3/26 405/212
4,824,282 A * 4/1989 Waldecker ............ E01F 13/046 404/6
4,926,995 A * 5/1990 Kauffman .............. B65G 39/07 193/37
5,037,242 A * 8/1991 Nill ........................... E02B 3/26 405/211
5,139,134 A * 8/1992 Schenck ................. B29C 53/42 156/187
5,207,313 A * 5/1993 Gebhardt ............... B65G 47/29 198/780
5,217,099 A * 6/1993 Marcus ............... H01M 2/1077 193/37
5,247,897 A * 9/1993 Pepp ....................... B63B 59/02 114/219
5,251,414 A * 10/1993 Duke ........................ B32B 5/26 428/128
5,381,887 A * 1/1995 Emmons ................ B65G 39/02 193/37
5,395,674 A * 3/1995 Schmidt .................... A61F 6/04 128/918
5,409,199 A * 4/1995 Kahmann ............... B29C 33/48 114/220
5,433,308 A * 7/1995 Gagnon ............. B29D 99/0035 193/37
5,597,262 A * 1/1997 Beavers .................. E01F 9/017 116/63 P
5,658,633 A * 8/1997 Di Biase .............. B65G 69/001 114/219
5,853,281 A * 12/1998 Farmer .................. B65G 69/30 193/35 R
5,893,210 A * 4/1999 Takei ........................ B28B 1/24 264/274
6,059,487 A * 5/2000 Haga ................... E01F 15/0476 256/13.1
6,068,100 A * 5/2000 Thomas .............. B29C 63/0013 193/37
6,109,675 A * 8/2000 Sumrall .................. B60R 19/56 293/117
6,178,909 B1 * 1/2001 Palmer ...................... E02B 3/26 114/219
6,185,859 B1 * 2/2001 Pirkle .................... A01K 85/00 138/178
6,196,150 B1 * 3/2001 Fondacaro .............. B63B 59/02 114/219
6,233,885 B1 * 5/2001 Hoffmann ............ B65G 69/008 52/173.1
6,336,543 B1 * 1/2002 Thomas .............. B29C 63/0013 193/37
6,520,711 B2 * 2/2003 Kim .................... E01F 15/0492 256/13.1
6,604,258 B2 * 8/2003 Saggio ................ B60B 33/0018 16/42 R
7,290,649 B2 * 11/2007 Wolkerstorfer ...... B65G 47/261 198/781.01
8,025,019 B1 * 9/2011 Katulka .................... E02B 3/26 114/220
8,434,965 B2 * 5/2013 Chae ..................... E01F 15/003 256/13.1
2002/0050241 A1 * 5/2002 Leonard .................. B63B 59/02 114/220
2002/0115547 A1 * 8/2002 Spiess .................... B65G 39/12 492/56
2002/0153229 A1 * 10/2002 Gilmore ................. B65G 21/14 198/568
2005/0166488 A1 * 8/2005 Borgerding .......... B65G 69/008 52/173.2
2005/0196233 A1 * 9/2005 Vijay .................. E01F 15/0438 404/6
2010/0012011 A1 * 1/2010 Gerst ...................... B63B 35/38 114/263
2014/0333017 A1 * 11/2014 Azof .................... B65G 69/001 267/140

* cited by examiner

DOCK BUMPER AND METHOD OF REPLACEMENT

The present invention relates to an improved dock bumper and method of replacing a worn dock bumper, and in particular, although not exclusively to an improved dock bumper for protecting loading bays from being damaged by reversing vehicles.

Dock bumpers or dock buffers are known. The dock bumper is installed on a loading bay and acts to protect the loading bay from damage when vehicles reverse up to the loading bay to load or unload contents from the vehicles. In the simplest form, it is known to form the dock bumper from a solid piece of resilient material. Here, rectangular, L-shaped, or other shaped blocks of typically composite reinforced rubber are bolted on the walls of the loading bay. Reversing vehicles will typically reverse up to and abut the dock bumper. The resilient nature of the rubber block allows the dock bumper to absorb some of the impact energy and therefore protect the loading bay from damage. Although after a number of impacts, the dock bumper becomes worn or damaged, the dock bumper can be simply replaced, saving having to make more serious and costly repairs to the loading bay. The dock bumpers can be produced in a variety of sizes, particularly height, to suit the application, and loading bay engineers are used to specifying the particulars.

More recently, the increased use of airbrakes on heavy goods vehicles has led to an increased wear/damage rate to the dock bumpers. This is because, during loading and unloading and as the airbrakes are turned on and off, the vehicles are caused to rise and lower. When the vehicles are pressed up against the dock bumper, the raising and lowering causes a frictional wear as the vehicle rubs against the dock bumper. Typically, the damage is increased because of the high frictional nature of resilient materials such as rubber. That is, the high frictional coefficient of the rubber causes the rubber to grip the vehicle as it attempts to move causing a tearing or ripping of the dock bumper at the point of impact. It is known to face the dock bumper with polyethylene to reduce the coefficient of friction between the vehicle and bumper in an attempt to allow the vehicle to slide against the dock bumper more readily. However, this is not always achievable because of the large forces involved. Furthermore, because particular loading bays are often accessed by similar vehicles, the dock bumpers are often impacted in a similar position. This repetitive impact can cause uneven wear and often, although the dock bumper is only damaged or worn in one part, the whole bumper requires replacement. Also, the repetitive impact can cause impressions in the surface of the dock bumper which will act to prevent the vehicle from sliding relative to the dock bumper.

More drastically, the up and down movement of the vehicle can be severe enough to rip the dock bumper from the wall of the loading bay. Particularly in cases where there is any prevention of movement between the vehicle and dock bumper. To improve the dock bumper's resistance to damage, it has been known to mount the dock bumper on a sliding frame. For instance, the rubber block is mounted on a nylon plate which slides within a frame. However, this does not prevent uneven wear and the whole dock bumper still requires replacement even though only a small portion of the barrier requires replacement. Furthermore, although the dock bumper may be able to slide upwards from a rest position upon first impact and release of the airbrakes, such dock bumpers are not able to cope as well with downwards initial movement, and the problems associated with a static dock bumper are therefore still present.

It is an object of the present invention to attempt to overcome at least one of the above or other disadvantages. It is a further aim to provide a dock bumper that moves freely relative to the loading bay wall to which it is installed in at least two opposed directions. It is a further aim to provide an improved dock bumper that provides an improved replacement method so that portions of the dock bumper that have not been damaged can be reused. It is a yet further aim to provide a dock bumper that provides a visual impact to act as guidance for reversing vehicle operators. A further aim is to provide a dock bumper that can be manufactured easily in a number of sizes without necessarily having to use bespoke moulds or parts for each size. Yet a further aim is to provide a dock bumper that can be efficiently assembled and disassembled.

According to the present invention there is provided a dock bumper as set forth in the appended claims. Other features of the invention will be apparent from the dependent claims, and the description which follows.

In the exemplary embodiments, a dock bumper comprises a housing for connection to a dock wall and a plurality of impact elements for absorbing the impact of the reversing vehicle. The impact elements are fixed to the housing and arranged in an array. The housing is for connection to a wall of the loading bay and is adapted to enable the impact elements to roll within the housing. Each impact element comprises an impact absorbing member and an outer layer at least partly enveloping the impact absorbing member, such as an outer sheath arranged about the impact absorbing member. The outer layer or sheath is relatively rigid compared to the impact absorbing member. Consequently, when the vehicle raises or lowers relative to the loading bay wall, the impact elements roll with the vehicle thereby preventing damage caused by relative movement between the vehicle and dock bumper. Furthermore, because the impact elements roll, each specific location of impact has a larger surface area than a flat surface. The life of the dock bumper is therefore typically extended. Furthermore, when the dock bumper becomes damaged and requires replacement, only the damaged impact elements need to be replaced. The remaining impact elements do not need to be replaced and therefore costs and environmental impact may be reduced.

In the exemplary embodiments, the impact elements are arranged in a planar array. That is, the array of impact elements is arranged in a single column or single row with a plurality of rows or columns, respectively. This allows the dock roller to occupy a larger area on a loading bay wall so that the impact of the vehicle can be potentially spread out across a greater surface area.

In the exemplary embodiments, the plurality of impact elements are held within the housing by a plurality of fixing members. The fixing members may be fixed directly between each impact element and the housing. However, the fixing members may be indirectly fixed between each impact element and the housing such that the fixing members are used to contain the impact elements. Furthermore, each fixing member may further couple the dock bumper to the wall of the loading bay or separate fixing members may be provided to connect the housing to the wall.

In the exemplary embodiments, the outer sheath may be designed to move towards the wall by compression or deformation of the internal impact absorbing member. This allows the compression forces to be absorbed by the dock bumper rather than directly through the wall.

In one exemplary embodiment, the reaction force on impact may be absorbed by the fixing members when the fixing members are used as axles to the impact elements. That is, the outer sheath moves towards the fixing member by compression or deformation of the impact absorbing member.

In another exemplary embodiment, the impact elements are freely held within the housing. When the impact elements are freely held the impact elements are allowed to roll. the energy of an impact in this instance is absorbed by one part of the outer sheath moving towards another part of the sheath wherein the movement is controlled by the impact absorbing member such as by compressing or deforming.

In the exemplary embodiments, each impact element includes an impact absorbing member that is arranged to absorb the impact. The impact absorbing member is suitably shown as a resilient member such as a rubber or composite rubber member. The impact absorbing member absorbs the impact of any collision by deforming or compressing to allow an outer surface of the impact element that faces the impact to move relative to the loading bay wall.

Although the impact absorbing member may be sufficient on its own, the exemplary embodiments are provided where each impact element includes an outer sheath to provide the outer surface of the dock bumper. The outer sheath is selected to have a different material characteristic than the impact absorbing member. That is, the outer sheath is selected in some embodiments to have a lower coefficient of friction than the impact absorbing member, particularly where the impact absorbing member, which is selected for its resilient properties, has a high coefficient of friction. This reduces the possibility of friction between the vehicle and dock bumper from generating destructive forces. Additionally or alternatively, the outer sheath may be selected to have a higher rigidity that the impact absorbing member. Here, the outer sheath provides resistance to deformation which could otherwise act to prevent rolling of the impact element. For instance, if the surface impacted by the collision squashed to form a substantially flattened area, the impact element would be less likely to roll as the vehicle moved. However, in some exemplary embodiments, a degree of resiliency in the outer sheath may be beneficial to aid the energy absorption. Furthermore, the outer sheath may be selected to provide an aesthetic surface finish, for instance a particular colour, to provide a visual aid to the reversing vehicle.

In some exemplary embodiments, each impact element is a roller and the dock bumper therefore comprises a plurality of rollers. Each roller is sized suitably in diameter and width to suit the demands of the application. Typically, the rollers are elongate and have a width of approximately 300% greater than diameter. However, the width may be at least 200% or at least 250% greater than the diameter or the width may be greater than 350% or 400% greater than the diameter. In these exemplary embodiments, each roller is shown as being a common size, however, rollers of different sizes are envisaged, wherein the rotational axis of the rollers are set back so the diameters of each roller lie on a common plane.

In one exemplary embodiment, the impact absorbing member absorbs the impact of any collision by allowing an outer surface of the roller that faces the impact to move relative to the rotational fixing between the roller and loading bay wall. Typically, the impact absorbing member is formed along the length of the rollers rather than being concentrated around the rotational fixing. Here, suitably the impact absorbing member is a cylindrical shape.

In one exemplary embodiment, the outer surface of each roller is arranged to rotate relative to the wall of the loading bay. That is, if the dock bumper is repeatedly impacted at one height, the surface of the dock bumper absorbing the impact and therefore prone to damage has been rotated so that a second impact at the same height, impacts a different area of the surface of the dock bumper. The life of the dock bumper is therefore typically extended. Where the roller is formed of two or more materials, the outer material may rotate relative to the inner material. However, it is preferable if the rollers are formed to act as one piece. That is, in the exemplary embodiments, the layers of each roller are fixed fast to each other so as to rotate with one another. In the exemplary embodiments, an axle component is provided which rotates relative to the frame. For instance, it is envisaged that the axle component may be mounted at either end to the frame so as to be able to rotate about its axis. In the exemplary embodiments the rollers are arranged so as to maintain a substantially straight rotational axis even during impact. Whist the material selection may be sufficient to allow the impact absorbing member to comprise the axle component, in the exemplary embodiments, each roller is shown as having a central axle comprising the axle component. The central axle is selected and sized so as to be substantially stiff. For instance, the central axle is shown in some of the exemplary embodiments as being a metal rod such as a steel rod. The rotational axis of each of the plurality of rollers may be spaced in a direction perpendicular to the rotational axis. Here, in one exemplary embodiment, the impact absorbing member is fixed fast to the central axle, for instance through frictional adhesion or other fixing method. The central axle being attached to the frame at each end in a rotational manner. Alternatively, the impact absorbing member may be arranged to rotate about the central axle, which is attached fast to the frame. Here, an axle sheath may be provided to rotate about the fixed central axle, where the axle sheath is secured fast to the impact absorbing member. In the exemplary embodiments, the outer sheath is formed about the impact absorbing member and forms the outer surface of the roller that contacts the vehicle. During impact, the outer sheath moves radially relative to the central axle by compression of the impact absorbing member. That is, the outer sheath moves towards the central axle. As the vehicle lifts or lowers, the roller is caused to rotate, thereby moving with the vehicle and preventing the vehicle from scrubbing against the dock bumper.

In the exemplary embodiments, each impact element, for instance the rollers may be fixed directly to the wall of the loading bay. However, it is preferable to supply the dock bumper as a ready to install device. Consequently, in the exemplary embodiments, a frame is provided. Suitably the frame is substantially U-shaped in cross section so as to provide two opposed side walls that extend away from a mounting plate and between which the rollers may be installed. The frame is adapted to be fixed to the wall of the loading bay in any known and suitable manner, for instance by bolting the mounting plate to the wall.

In one exemplary embodiment, the frame includes rotational fixing points for attaching each roller to. The rotational fixing points may be arranged so that the rollers are spaced approximately 110% of the diameter of the rollers. However, the rollers may be spaced more than 115% or more than 120% of the diameter of the rollers or the rotational fixing points may be spaced at more than 100% or more than 105% of the diameter of the rollers. The rollers are not arranged to touch as they would counter rotate, however, the rollers may be geared together so that rotation of one rotates the others. In the exemplary embodiments however, it is preferable for each roller to rotate independent to the other rollers.

In one exemplary embodiment, each roller rotates relative to the frame. In the exemplary embodiments including the central axle, the central axle protrudes through apertures in the frame. Here, the central axle may rotate within the apertures. In some exemplary embodiments, the rotation between the central axle and frame may be enhanced by the provision of a low coefficient insert such as a nylon insert. Although bearings are possible, they are not thought necessary in all but the highest impact force applications. In other exemplary embodiments, the central axle is fixed fast to the frame and the rollers rotate about the central axle. Again, although bearings are possible, for instance a nylon sheath or sheath of other low-coefficient of friction material, they are not thought necessary in all but the highest impact force applications.

In a first embodiment, each roller comprises an impact absorbing member and an outer sheath, wherein the outer sheath has a different material characteristic to the impact absorbing member and the outer sheath is designed to move towards a rotational axis of the roller by compression of the impact absorbing member.

In the first embodiment, the outer sheath may be arranged to have a lower coefficient of friction than the impact absorbing member. The outer sheath may be arranged to have a higher resistance to deformation than the impact absorbing member.

In the first embodiment, the dock bumper may include a frame wherein each roller may be assembled to the frame in a rotational manner. Each roller may include an axle component that is assembled to the frame, wherein the axle component is arranged to allow the respective roller to rotate. The axle component may be selected to be stiff enough so as not to bend upon impact. The axle component may include a central axle, wherein the central axle is supported by the frame in a rotational manner and the respective roller is attached fast to the central axle. The axle component may include a central axle that is secured fast to the frame, and the respective roller is arranged to rotate about the central axle. The axle component may include an axle sheath, wherein the axle sheath is arranged to rotate about the central axle and the respective roller is secured fast to the axle sheath.

According to the exemplary embodiments, a method of protecting a loading bay from damage may be provided, the method comprising securing a dock bumper of the exemplary embodiments to a wall of a loading bay to be protected, causing a vehicle to abut an impact element of the dock bumper, wherein said abutment causes an outer surface of said impact element to move towards said wall to absorb a portion of the force generated by the impact. The method may further comprise replacing at least one of the impact elements after said impact element has become damaged.

According to a further exemplary embodiment, a method of assembling a first and second dock bumper is provided, wherein each dock bumper is in accordance with the exemplary embodiments. The first dock bumper may have a first height and the second dock bumper may have a second, different height. The method may comprise using a first frame to secure a plurality of first type of impact elements to assemble the first dock bumper and using a second frame to secure a plurality of first type of impact elements to assemble the second dock bumper.

In a second exemplary embodiment, each impact element is provided as a roller and the dock bumper therefore comprises a plurality of rollers. Each roller is sized suitably in diameter and width to suit the demands of the application. Typically, the rollers are elongate and have a width of approximately 300% greater than diameter. However, the width may be at least 200% or at least 250% greater than the diameter or the width may be greater than 350% or 400% greater than the diameter. In the second aspect, each roller is shown as being a common size, however, rollers of different sizes are envisaged. An axle may or may not be provided. When an axle is not provided, the impact members may be freely held so that depression of the impact barrier may also occur as well as rolling of the impact barrier. The rollers may be rotatably fixed. For instance, an axle may be provided, as in the first aspect. When an axle is provided, a rotational axis of the rollers is defined by the axle. The rotational axis of the rollers may be set back so the diameters of each roller lie on a common plane. The rotational axis of the plurality of rollers may be spaced in a direction perpendicular to the rotational axis. The axle may be fixed within the housing or outside of the housing. Alternatively, a combination of fixtures within and outside the housing may be used.

In a third exemplary embodiment, the impact elements may be balls. This advantageously provides a higher density of impact elements per unit area. This helps to better distribute the impact from multiple surfaces of the vehicle. This also helps reduce the wear on each ball because the impact force can be more evenly distributed across the dock bumper. Advantageously, the maintenance requirement of the dock bumper may be reduced. The balls may be provided to be freely held so that the roll direction of each ball is independent and the roll direction can match the movement from the point of impact. Each ball may be sized differently depending on its location on the dock bumper. For instance, the balls on the outside may be softer than the inside or the balls on the inside may be softer than the outside. The size difference between the balls may also vary to provide a varying degree of cushioning and contact heights.

In the second and third exemplary embodiments, the outer sheath may be arranged to also move away from the wall by compression of the impact absorbing member. This movement is in addition to the compression of the impact absorbing members towards the wall during impact. This allows the compression force to be more greatly spread across the impact element which helps to improve the cushioning of the impact and avoid damage to the vehicle and the dock bumper. When the impact elements are freely held, the movement away from the wall may vary depending on the direction of impact. For instance, if the vehicle impacts in a downwardly inclined direction, the compression through the back of the housing may also occur in a downward location. However, on a lateral or side impact, the compression may occur in a different location. This is advantageous over a rotatably fixed impact element because the compression forces can be distributed through different parts of the dock bumper depending on the direction of impact. This helps to increase the life of the dock bumper.

In the second and third exemplary embodiments, the housing may be comprised of an outer housing and an inner housing. The housing may be arranged in a coupled position such that the outer and inner housings are coupled together by the plurality of fixing members. These fixing members may further be used for connection of the dock bumper to the wall. An outer housing is advantageous because multiple impact elements can be removed simultaneously. This helps to reduce downtime because the time taken to service the dock bumper and replace all impact elements is reduced. By coupling the housing together, the coupling force across the impact elements may be more evenly distributed. This allows the height of the impact elements to be consistent and controlled. The fixing members may be concealed by the outer housing. For instance, when inner housing which is for connection to the wall may include separate fixings so that the additional function of coupling the outer and inner housings is separated. For instance, clips may be used to attach the outer housing to the inner housing. These clips may be integral to the inner or outer housings or may be provided separately.

In the second and third exemplary embodiments, the housing may comprise a plurality of pockets when arranged in the coupled position. Each pocket may be capable of at least partially containing each impact element. Furthermore, each pocket is formed from an opening arranged in the outer housing and a recess arranged in the inner housing, wherein in the coupled position, each impact element is partially raised through each opening and each recess accommodates each impact element when each impact element deforms on impact. Furthermore, the shape of each recess corresponds to the external shape of the impact element contained therein. This advantageously helps to improve the distribution of forces on impact because the compression of the impact element is spread over a greater area. Each pocket may be provided with a biasing member to reset the impact element to a desired position after impact. For instance, a spring may be installed in the housing, preferably the inner housing.

In the exemplary embodiments, multiple dock bumpers may be stacked upon or next to each other to change the size of the dock bumper. Advantageously, in the exemplary embodiments including a frame, it is only the frame that needs to be enlarged to provide dock bumpers of different height. That is, the impact elements are a common product between all heights of the same width dock bumper.

In the exemplary embodiments, the dock bumper may be arranged in a multidimensional array whereby there are a plurality of rows and columns. Preferably, the entire multidimensional array contains impact elements. However, the multidimensional array may have vacant cells within the array so that the multidimensional array is not square or rectangular.

For a better understanding of the invention, and to show how embodiments of the same may be carried into effect, reference will now be made, by way of example, to the accompanying diagrammatic drawings in which.

Figure 1:
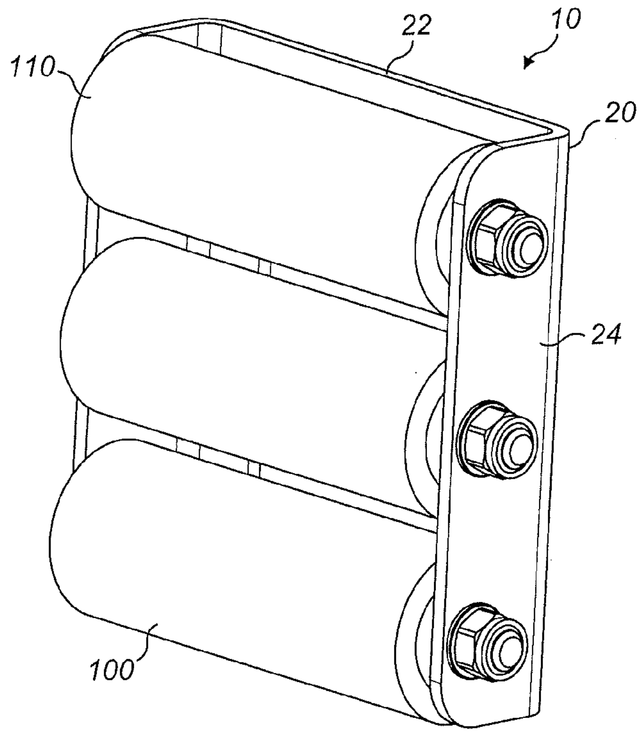
FIGS. 1 and 2 are perspective views of a front and back respectively of a dock bumper in accordance with a first exemplary embodiment.

Referring to FIG. 1, a dock bumper 10 is provided. The dock bumper 10 comprises a frame 20 supporting a plurality of rollers 100. The plurality of rollers 100 are arranged to absorb impact from a reversing vehicle. Upon impact and subsequent raising or lowering of the vehicle, outer surfaces 110 of the rollers 100 are arranged to rotate relative to the frame 20. Consequently, scrubbing between the vehicle and dock bumper is reduced as are excess forces acting on fixings between the frame 20 and wall. Also, a surface area at each contact location is increased as a fresh area is provided by rotation of the roller, thereby prolonging the operational life of the rollers. Furthermore, the dock bumper is modularised so that only worn or damaged rollers need be replaced at one time.

Figure 2:
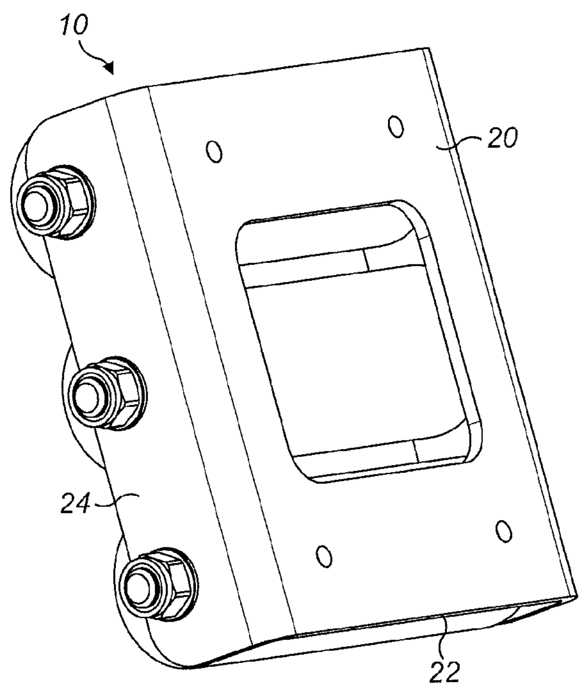
Figure 3:
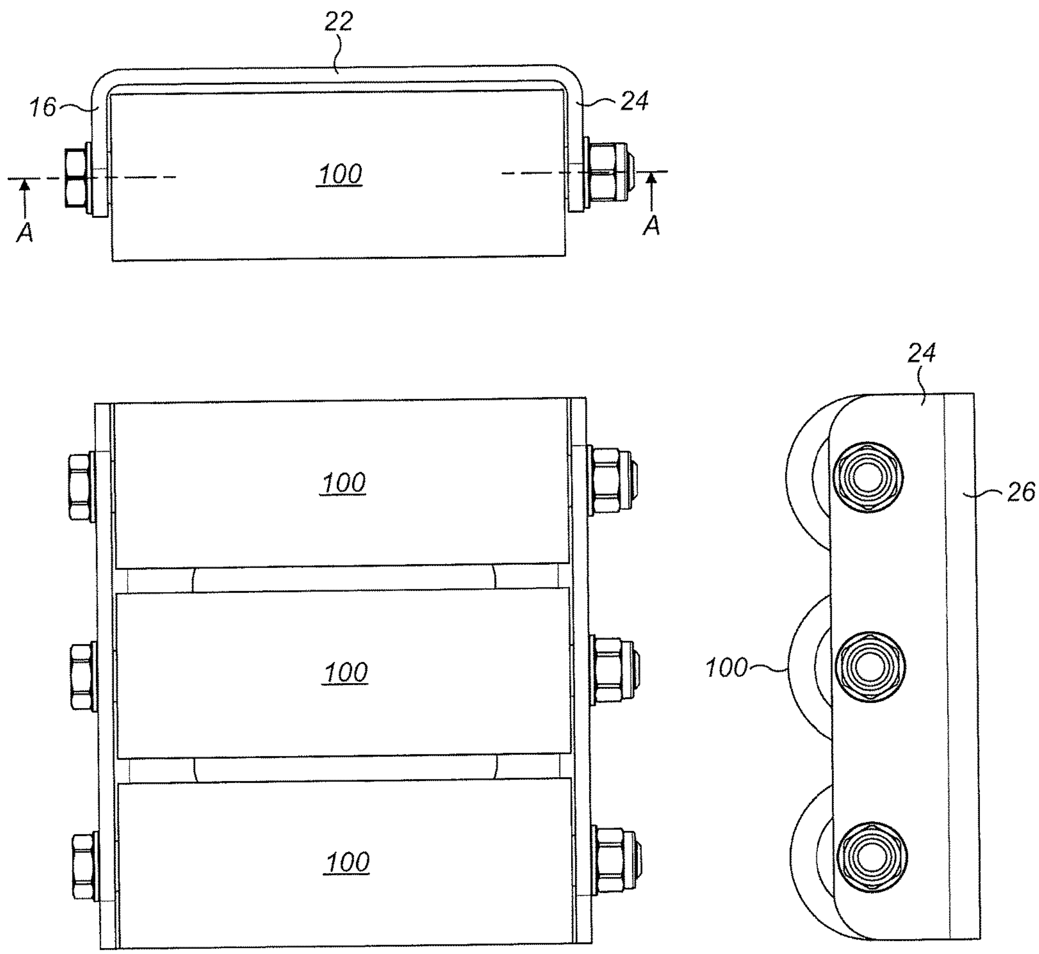
FIG. 3 is a front, side and top isometric views of the dock bumper of the first exemplary embodiment.
Figure 4:
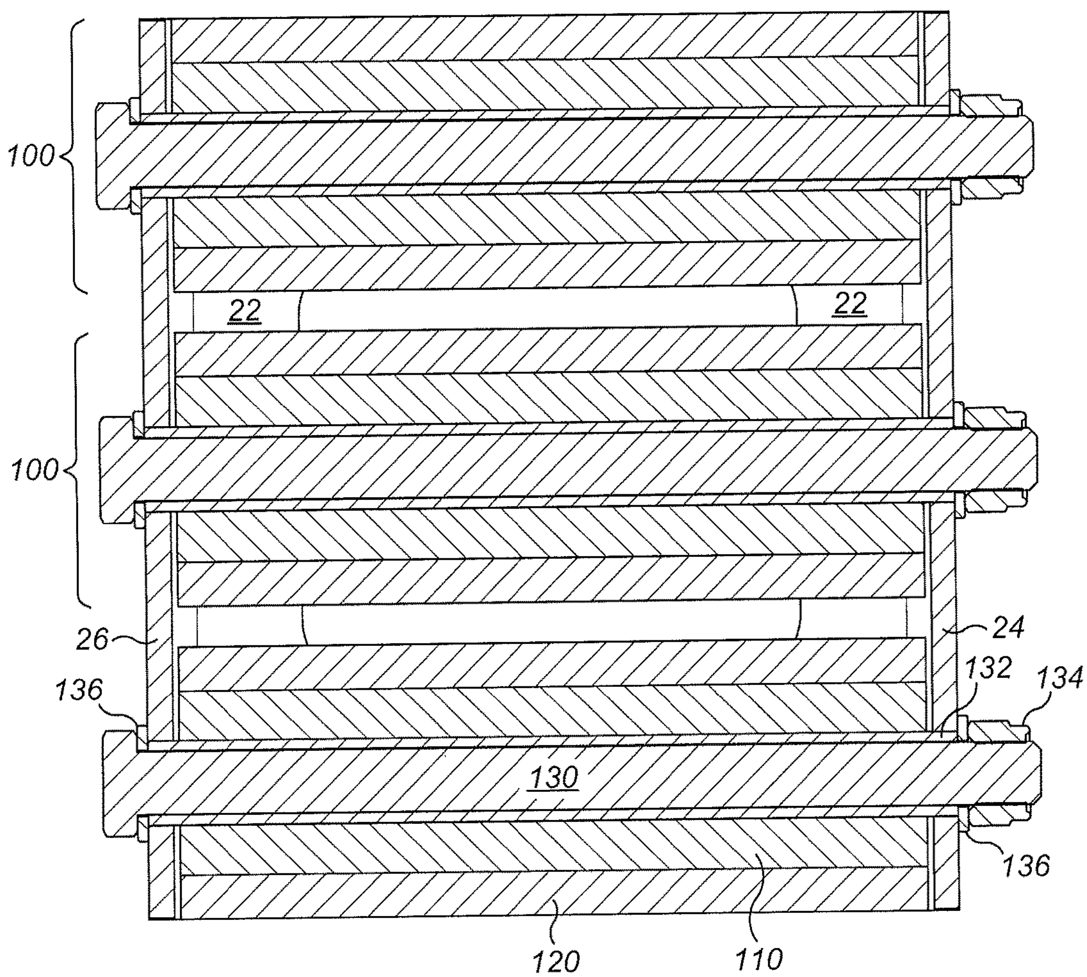
FIG. 4 is a cross sectional view through A-A of FIG. 3.

Referring to FIGS. 1 to 3, the frame has a generally u-shaped cross section. The frame is shown as a bent plate forming a base plate 22, and two opposed sides 24, 26. However, other forming and constructional methods are applicable. The opposed sides 24, 26 include fixings for receiving the rollers 100. Referring to FIG. 4, the fixings are apertures through the opposed sides 24, 26. The fixings are spaced to arrange the rollers at appropriate spacing along the height of the dock bumper.

Referring to FIG. 4, each roller 100 includes an impact absorbing member 110 and an outer sheath 120. The impact absorbing member 110 and outer sheath 120 are fixed together so as to rotate as one piece. The parts may be fixed together via a variety of methods. However, a compression fit where the outer sheath is made undersized as opposed to the uncompressed size of the impact absorbing member so that the impact absorbing member is compressed when the sheath is fitted thereby creating a frictional force to lock the two parts together has been found to be particularly suitable. The impact absorbing member 110 is an elongate cylinder formed from a material having a high resiliency to absorb an impact force. For instance, a rubber, polymer passed member having elastic properties or Ethylene Propylene Diene Monomer (EPDM). The outer sheath provides protection to the impact absorbing member. The outer sheath is selected to have one or more different material characteristics to the impact absorbing layer. For instance, the outer sheath 120 that provides the outer surface of the dock bumper that contacts the vehicle may be selected to have a distinctive colouring for visual recognition, or to have a lower coefficient of friction to reduce any rubbing between the vehicle and dock bumper. The outer sheath may also be selected from a material having a high strength compared to the impact absorbing member so as to maintain its shape during impact.

Referring to FIG. 4, the rollers 100 include a central axle 130 that is arranged to rotate relative to the frame 20. The central axle 130 forms a pin and extends through the sides of the frame and is secured by the fixings on distal ends. A fixing such as a nut 134 secures one end of the central axle and pin head the other. Washers 136 are placed between the nut and pin head and respective sides of the frame 20. The central axle may be arranged to rotate relative to the frame. That is, the central axle may rotate in the apertures. However, in FIG. 4, the central axle is shown as being fixed fast to the frame. Here, an axle sheath 132 is provided that rotates about the central axle. The axle sheath is secured to the impact absorbing member 110. Together, the central axle 130 and axle sheath 132 form an axle component. The central axle provides a rigid core to the roller such that the rotational axis of the roller remains substantially straight during impact. As shown in FIG. 4, it is preferable if the axle sheath also extends through the frame so as to give the central axle greater strength. Consequently, the outer sheath moves relative to the central axle by deformation of the impact absorbing member. It is this movement and deformation or compression of the impact absorbing member that generates the impact absorption of the dock bumper.

The impact absorbing member is fixed fast to the central axle by any suitable method but again, a particularly suitable method has been found to be a compression fit formed by making the axle sheath oversized as compared to a bore in the impact absorbing member within which the axle sheath fits. Because the roller acts a single piece, as the vehicle raises or lowers relative to the loading bay, the rollers are caused to rotate and prevent unnecessary damage or forces from being transferred.

Figure 5:
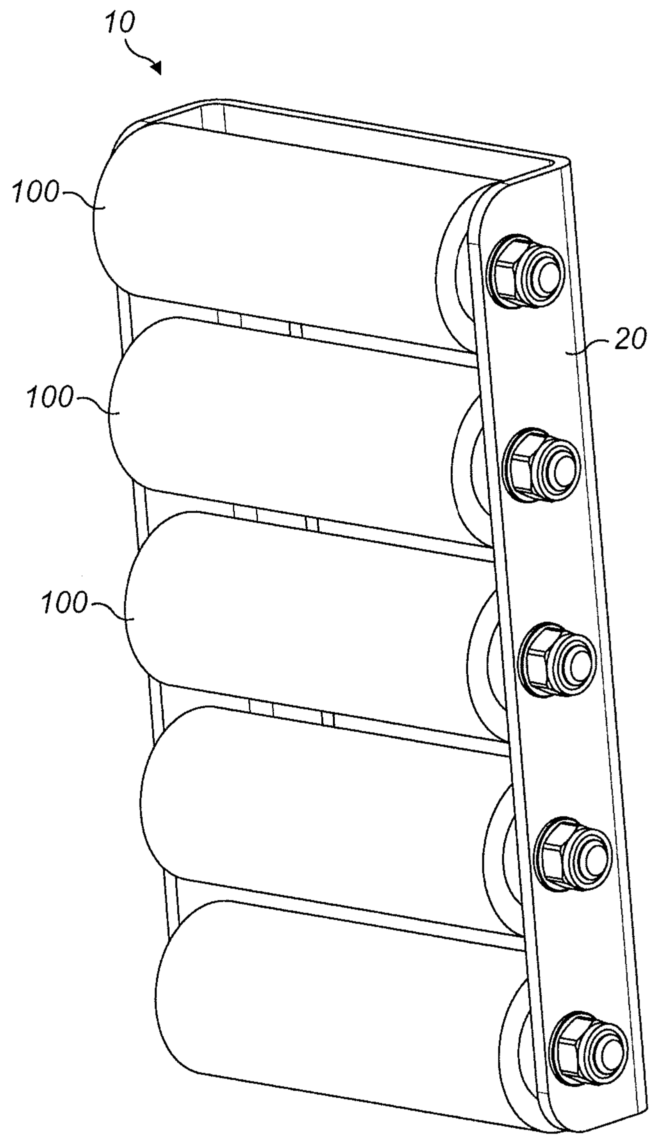
FIG. 5 is a perspective front view of a dock bumper according to a second embodiment.
Figure 6:
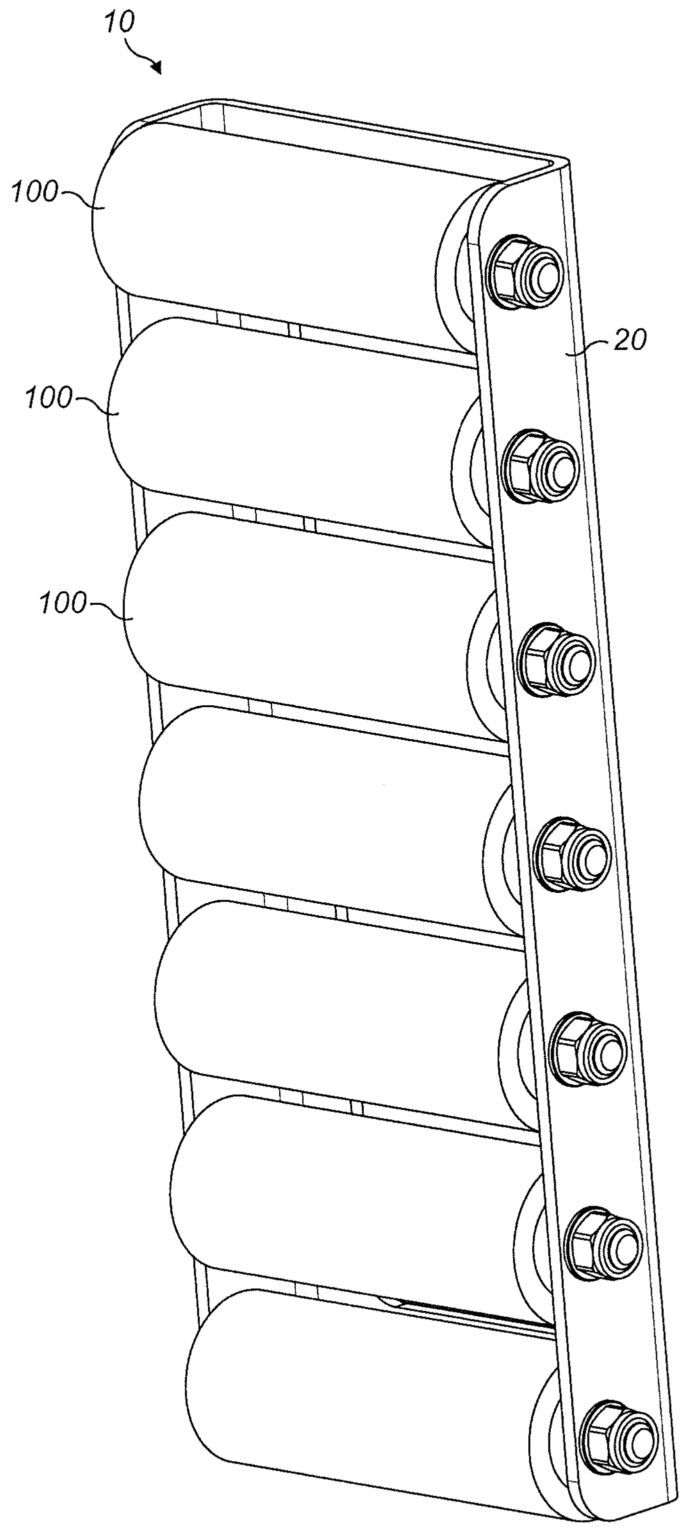
FIG. 6 is a perspective front view of a dock bumper according to a third embodiment.

The dock bumpers can be increased in size simply by enlarging the height of the frame 20. Consequently, as can be seen in FIGS. 5 and 6 larger dock bumpers can be provided by simply adding more rollers 100. Although a plurality of rollers is provided, in the exemplary embodiment three rollers are shown. In theory, any number of rollers can be added and embodiments of five or more rollers or seven or more rollers are envisaged. Because only the frame needs to be changed to produce the different height dock bumpers, the manufacturing costs of stock, moulding and tools is reduced.

Figure 7:
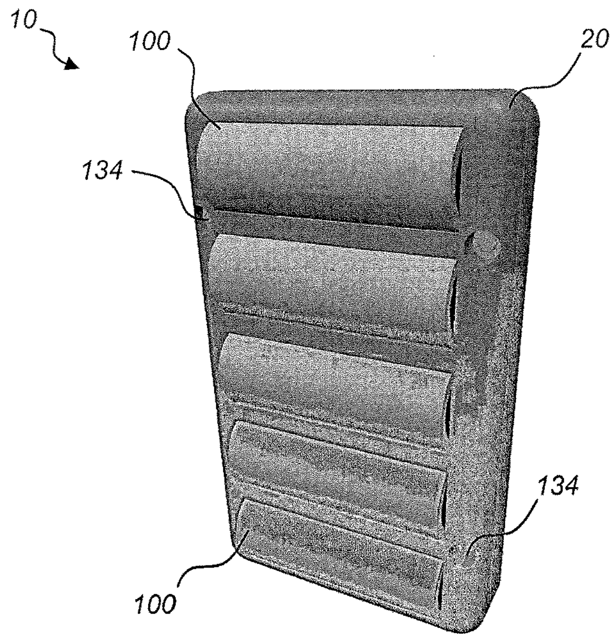
FIG. 7 is a perspective view of a front of a dock bumper according to a fourth embodiment.
Figure 8:
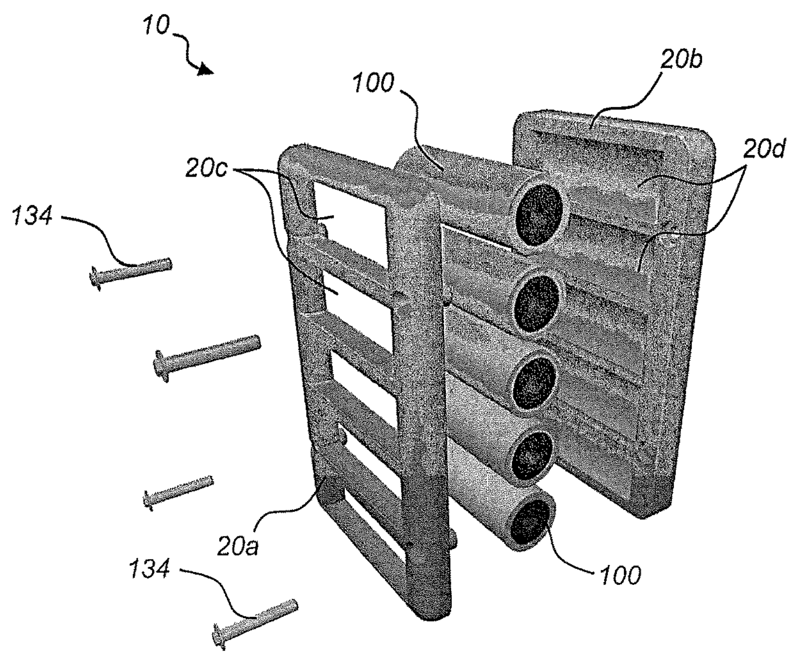
FIG. 8 is an exploded perspective view of the dock bumper according to the fourth embodiment.

Referring to FIGS. 7 and 8, a dock bumper 10 according to another embodiment is provided. The dock bumper 10 shows a plurality of impact elements 100 arranged as rollers 100. As can be seen, the rollers comprise an outer sheath and an inner impact absorbing member. The rollers 100 are shown as a one-dimensional array in that the longitudinal axes of the rollers are arranged perpendicular to each other. This one-dimensional array is a single column of rollers 100 and multiple rows. In this example, the rollers 100 have equal sizes so that each length of the rollers 100 is the same. The rollers 100 are partially encased by a housing 20 in that the top surface of the rollers 100 are exposed and positioned to absorb an impact on contact by a vehicle. The housing 20 wraps around the rollers 100 and provides struts that cross the housing and help to separate the rollers 100 when in the rollers 100 are positioned on the dock bumper 10. Suitably a front housing and a rear housing is provided. The front and rear housings a secured together to encase the elements whilst allowing the elements to protrude from the front face. Fixing members 134 are also shown to couple the housing 20. Although not shown, these fixing members 134 can easily be further fixed to a wall. As shown in FIG. 8, the housing 20 comprises an outer housing 20*a* and an inner housing 20*b*. The fixing members 134 couple the outer and inner housings 20*a*,20*b* such that the rollers 100 are freely held in the dock bumper 10. It is possible however, to further provide axles for the rollers 100 so that the rollers 100 are rotatably fixed. When coupled together, the housing provides pockets for the rollers 100 to be held within and be partially exposed from. These pockets comprise openings 20*c* in the outer housing 20*a* and recesses 20*d* in the inner housing 20*b*. The recesses 20*d* correspond to the shape of the rollers 100 so that the rollers 100 can evenly compress into the recess 20*d*. This helps to spread the compression force and helps to prolong the life of the rollers 100 and of the dock bumper 10 as a whole. The recesses 20*d* are provided integral to the inner housing 20*b* but may also be provided as a separate component which can be retro-fitted into the inner housing 20*b*.

Figure 9:
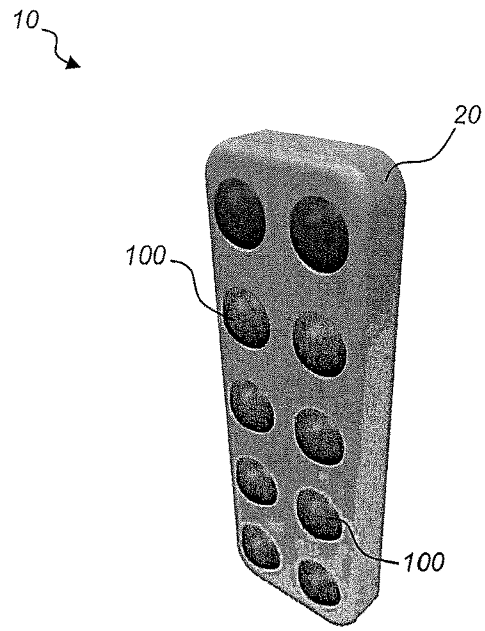
FIG. 9 is a perspective view of a front of a dock bumper according to a fifth embodiment.
Figure 10:
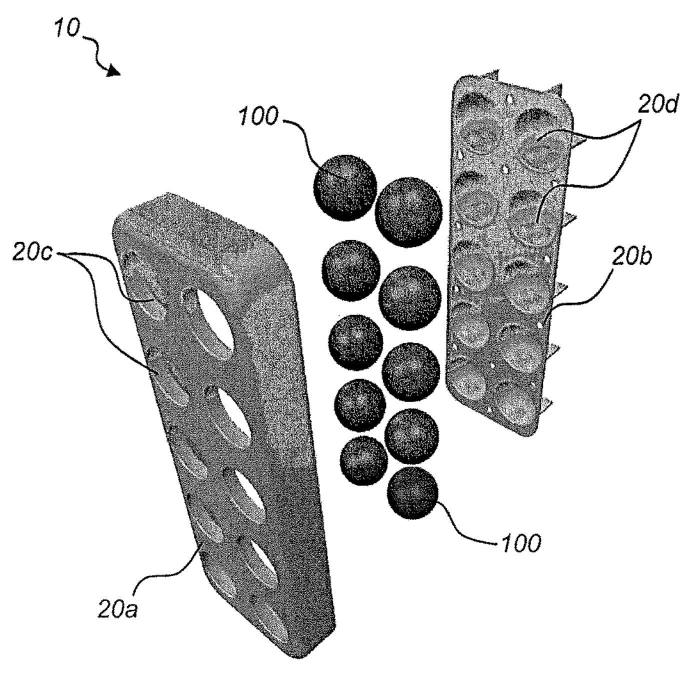
FIG. 10 is an exploded perspective view of the dock bumper according to the fifth embodiment.

Referring to FIGS. 9 and 10, a dock bumper 10 according to a further embodiment is provided. Here, the impact elements 100 are shown as balls 100. The balls 100 are arranged in a multidimensional array in that a plurality of rows and columns and the array is shown as completely filled with balls 100. The balls 100 are freely held within the housing 20 so that the balls can roll independently in any direction. In the exploded view, the dock bumper 10 shows an outer housing 20*a* and an inner housing 20*b*, whereby the outer housing comprises openings 20*c* and the inner housing 20*b* comprises recesses 20*d* which together form pockets in the housing 20. The inner housing is shown with fins on the rear which helps to reduce the material used thus reducing the weight of the dock bumper 10. Although not shown, the dock bumper 10 is provided with multiple locations for fastening the outer housing 20*a* and inner housing 20*b* together. These fasteners or fixing members may be separate to the fixing members used to connect the housing 20 to the wall. This allows the outer housing 20*a* to be easily removed in situ whilst the inner housing 20*b* remains fixed to the wall. The housing 20 may be coupled by clips which may be integral to the inner housing 20*a* or outer housing 20*b* or provided separately.

From the foregoing it will be appreciated that there is provided an improved dock bumper that is able to accommodate upwards or downwards movement of a vehicle at any point in the cycle of the movement of the dock bumper. Moreover, the environmental impact of the dock barrier is reduced because only damaged parts of the dock bumper need be replaced. Furthermore, the dock bumper may be made more cost effectively as only the frame 20 needs to be changed to produce different height dock bumpers.

Although preferred embodiment(s) of the present invention have been shown and described, it will be appreciated by those skilled in the art that changes may be made without departing from the scope of the invention as defined in the claims.

The invention claimed is:

1. A method of protecting a loading bay from damage, the method comprising:

securing a dock bumper to a wall of a loading bay to be protected, the dock bumper having a housing for connection to the wall, and the loading bay being for use by heavy goods vehicles having airbrakes, wherein:

the housing of the dock bumper holds a plurality of impact elements arranged in an array, each of the impact elements being allowed to roll freely within the housing when the dock bumper is secured to the wall of the loading bay;

the housing comprises (i) an outer housing, (ii) an inner housing coupled to the outer housing by a plurality of fixing members, and (iii) a plurality of pockets that are each formed from an opening in the outer housing and a corresponding recess in the inner housing, each pocket at least partially containing one of the plurality of impact elements;

each of the impact elements is spaced from the wall of the loading bay by at least the inner housing;

each of the impact elements is adapted so that abutment of the impact element by a vehicle causes an outer surface of the impact element to move towards the wall to absorb a portion of the force generated by the abutment; and each of the impact elements comprises (i) an impact absorbing member and (ii) an outer sheath arranged about the impact absorbing member, the outer sheath being relatively rigid compared to the impact absorbing member.

2. The method of claim 1, further comprising replacing at least one of the plurality of impact elements of the dock bumper that has become damaged.

3. The method of claim 1, further comprising causing the vehicle to abut an impact element of the plurality of impact elements.

4. The method of claim 1, wherein for each of the plurality of impact elements, the outer sheath has a lower coefficient of friction than the impact absorbing member.

* * * * *